(12) United States Patent
Huang

(10) Patent No.: US 7,848,098 B2
(45) Date of Patent: Dec. 7, 2010

(54) HARD DISK BRACKET AND ELECTRONIC DEVICE EMPLOYING THE SAME

(75) Inventor: Hsu-Hsin Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 77 days.

(21) Appl. No.: 12/436,093

(22) Filed: May 5, 2009

(65) Prior Publication Data

US 2010/0020485 A1 Jan. 28, 2010

(30) Foreign Application Priority Data

Jul. 25, 2008 (CN) .................... 2008 1 0303081

(51) Int. Cl.
*G06F 1/16* (2006.01)
*H05K 7/16* (2006.01)
*A47B 81/00* (2006.01)
*A47F 7/00* (2006.01)

(52) U.S. Cl. .................. 361/679.33; 361/679.37; 361/726; 312/223.1; 312/223.2; 211/26

(58) Field of Classification Search . 361/679.01–679.4, 361/724–727, 679.41–679.45, 679.55–679.59, 361/752–755, 759; 312/223.2; 211/26
See application file for complete search history.

(56) References Cited

U.S. PATENT DOCUMENTS

| | | | |
|---|---|---|---|
| 5,682,291 A * | 10/1997 | Jeffries et al. .......... 361/679.58 |
| 6,102,499 A * | 8/2000 | Chen et al. ............... 312/223.2 |
| 6,227,516 B1 * | 5/2001 | Webster et al. .............. 248/694 |
| 6,337,793 B1 * | 1/2002 | Vier et al. .............. 361/679.57 |
| 7,295,432 B2 * | 11/2007 | Xu ........................ 361/679.33 |
| 7,375,922 B2 * | 5/2008 | Chen et al. ............... 360/97.02 |
| 7,639,490 B2 * | 12/2009 | Qin et al. ............... 361/679.34 |
| 2005/0088778 A1 * | 4/2005 | Chen et al. ............... 360/97.02 |
| 2006/0209508 A1 * | 9/2006 | Han et al. .................... 361/685 |

FOREIGN PATENT DOCUMENTS

CN 2833794 Y 11/2006

* cited by examiner

*Primary Examiner*—Jayprakash N Gandhi
*Assistant Examiner*—Nidhi Desai
(74) *Attorney, Agent, or Firm*—Frank R. Niranjan

(57) ABSTRACT

A hard disk bracket for fixing a hard disk defining a plurality of positioning holes in two opposite sidewalls thereof includes a chassis and two substantially parallel rows of fixing members projecting from the chassis, spaced from each other, and receiving the hard disk therebetween. Each row of the fixing portion includes at least resilient two limiting portions each including a positioning pin received in the corresponding positioning hole to fix the hard disk and at least one supporting portion including a supporting plate parallel to the chassis to support the hard disk. The at least two limiting portions align with the at least one supporting portion. A distance between the surface of the chassis and the positioning pin is greater than that between the surface of the chassis and the supporting plate.

11 Claims, 3 Drawing Sheets

HARD DISK BRACKET AND ELECTRONIC DEVICE EMPLOYING THE SAME

BACKGROUND

1. Technical Field

The present disclosure relates to electronic devices, especially to a hard disk bracket of an electronic device.

2. Description of Related Art

In electronic devices, such as desktop computers, servers, Internet appliances, for example, hard disks are required to store data. A frequently used hard disk is directly fixed in an enclosure of the electronic device by screws, resulting in inconvenience of assembly or disassembly of the hard disk.

It is thus desirable to provide a hard disk bracket to alleviate the described limitations.

DETAILED DESCRIPTION

Figure 1:
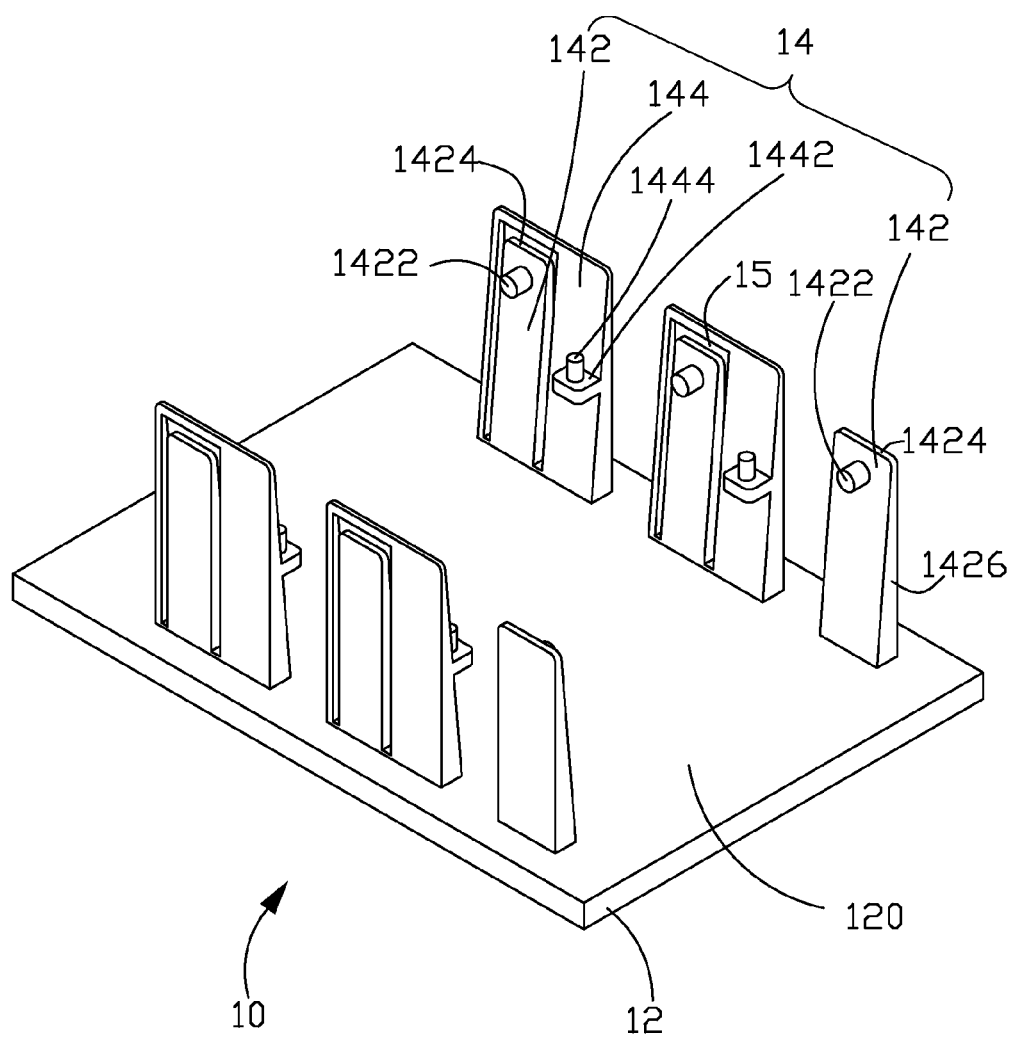
FIG. 1 is a perspective view of a hard disk bracket in accordance with the disclosure.
Figure 2:
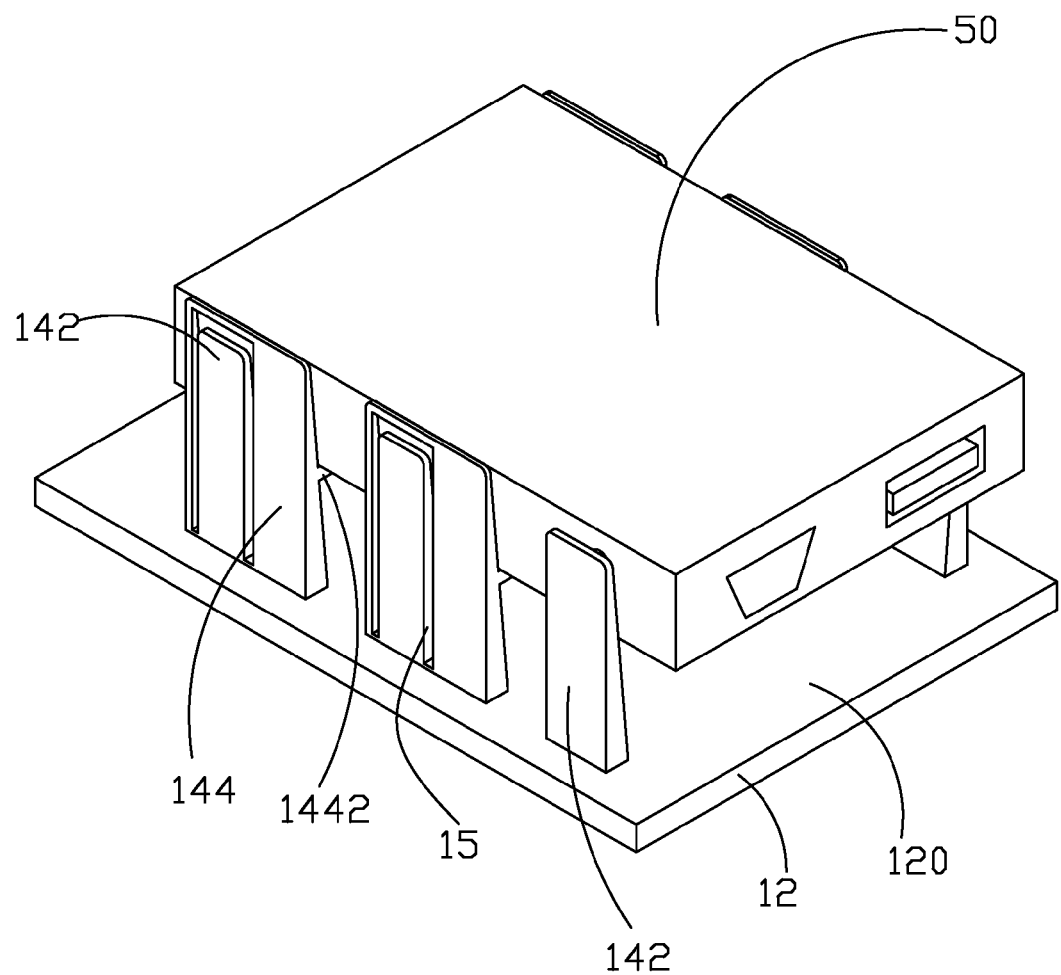
FIG. 2 is an assembled view of the hard disk bracket of FIG. 1 with a hard disk being attached thereto.
Figure 3:
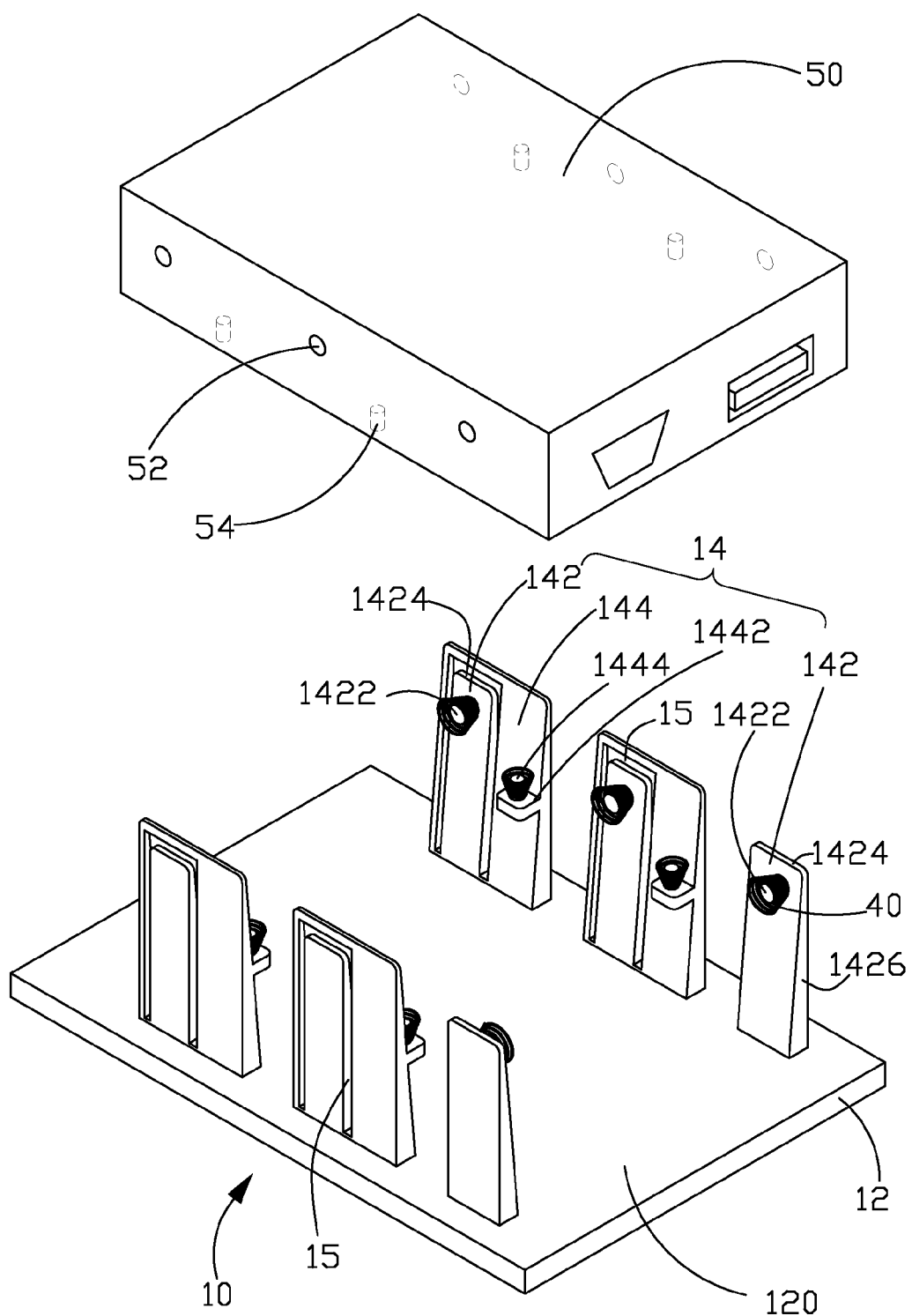
FIG. 3 is an exploded, perspective view of hard disk bracket with springs and the hard disk of FIG. 2.

Referring to FIG. 1-FIG. 3, a hard disk bracket 10 is used for fixing a hard disk 50. The hard disk 50 defines a plurality of positioning holes 52 in two opposite sidewalls thereof and a plurality of recesses 54 in a bottom wall thereof.

The hard disk bracket 10 may be formed using an injection mold process to conserve parts costs, in one example. However, it may be understood by those of ordinary skill in the art that the hard disk bracket 10 may be formed using other techniques.

The hard disk bracket 10 includes a chassis 12 including a surface 120 and two substantially parallel rows of fixing members 14 projecting from the surface 120 of the chassis 12 spaced from each other and receiving the hard disk 50 therebetween. Each row of the fixing members 14 includes three limiting portions 142 and two supporting portion 144. Alternatively, one or more limiting portions 142 and supporting portions 144 can be utilized.

The three limiting portions 142 align with the two supporting portions 144. In this embodiment, the fixing members 14 are integrally formed with the chassis 12. In each row of the fixing members 14, at least one of the three limiting portions 142 and at least one aligned of the two supporting portions 144 are integrally formed. An inverted U-shaped slot 15 surrounding each of the limiting portions 142 is integrally formed with and defined in the supporting portions 11, so that the limiting portions 142 have good resilience permitting the hard disk to be positioned in the hard disk bracket.

Alternatively, the two of the three limiting portions 142 are separated from the two supporting portions 144. In other words, each of the rows of the fixing members 14 includes three limiting portions 142 and two supporting portions 144 separated from the fixing portions 142 and between each two adjacent fixing portions 142.

Each of the three limiting portions 142 includes a positioning pin 1422 projecting from an inner surface thereof, adjacent to a top free ends 1424 thereof, and received in a corresponding positioning hole 52 to fix the hard disk 50 in the hard disk bracket 10. A cross-section 1426 of each of the limiting portions 142 is trapeziform with a narrow top side edge, so that each of the top free ends 1424 of the limiting portions 142 can be deflect under an external force, and the positioning pins 1422 are easily inserted into or removed from the corresponding positioning holes 52 of the hard disk 50 when the hard disk 50 is attached to the hard disk bracket 10. Each supporting portion 144 includes a supporting plate 1442 projecting from an inner surface thereof and parallel to the chassis 12 to support the hard disk 50. Each supporting plate 1442 includes a positioning block 1444 projecting upwardly capable of being inserted into a corresponding recess 54 of the hard disk 50 to further fix the hard disk 50 in the hard disk bracket 10.

A distance between the surface 120 of the chassis 12 and the positioning pin 1422 is greater than between the surface 120 of the chassis 12 and the supporting plate 1442.

In the illustrated embodiment, the hard disk bracket 10 further includes a plurality elastic elements 40, such as springs, to protect the hard disk 50 from vibration, where some of the elastic elements 40 are respectively located between the limiting portions 142 and the side walls of the hard disk 50, and others are respectively located between the supporting plates 1442 and the bottom wall of the hard disk 50 after the hard disk 50 is attached to the hard disk bracket 10.

The hard disk 50 is fixed in an enclosure of an electronic device (not shown) by the hard disk bracket 10 rather than screws, resulting in convenience of assembly or disassembly of the hard disk 50.

While exemplary embodiments have been described, it should be understood that they have been presented by way of example only and not by way of limitation. The breadth and scope of the disclosure should not be limited by the described exemplary embodiments, but only in accordance with the following claims and their equivalents.

What is claimed is:

1. A hard disk bracket for fixing a hard disk defining a plurality of positioning holes in two opposite sidewalls thereof, the hard disk bracket comprising: a chassis; and two substantially parallel rows of fixing members projecting from the chassis, spaced from each other, and receiving the hard disk therebetween, each of the two rows of the fixing members comprising at least two limiting portions each comprising a positioning pin received in the corresponding positioning hole of the hard disk to fix the hard disk and at least one supporting portion comprising a supporting plate parallel to the chassis to support the hard disk, wherein the at least two limiting portions align with the at least one supporting portion, and wherein the at least two limiting portions are resilient so that the positioning pins can be easily inserted into or removed from the corresponding positioning holes of the hard disk; wherein a distance between the chassis and the positioning pin is greater than that between the surface of the chassis and the supporting plate; and wherein the hard disk defines a plurality of recesses in a bottom wall thereof, and wherein the supporting plates each comprise positioning blocks projecting therefrom upwardly capable of inserted into corresponding recesses of the hard disk.

2. The hard disk bracket as claimed in claim 1, further comprising a plurality of elastic elements respectively located between the limiting portions and the side walls of the hard disk to protect the hard disk from vibration.

3. The hard disk bracket as claimed in claim 1, wherein in each row of the fixing members, at least one limiting portion and at least one aligned supporting portion is integrally formed.

4. The hard disk bracket as claimed in claim 3, further comprising an inverted U-shaped slot surrounding the limiting portion, adapted to provide resilience permitting the hard disk to be positioned in the hard disk bracket.

5. The hard disk bracket as claimed in claim 1, wherein the limiting portions are separated from the supporting portions.

6. The hard disk bracket as claimed in claim 1, wherein the hard disk bracket is formed using an injection molded process.

7. An electronic device comprises: a hard disk defining a plurality of positioning holes in two opposite sidewalls thereof; and a hard disk bracket comprising: a chassis; and a plurality of fixing members projecting from the chassis corresponding to the two opposite sidewalls of the hard disk, and receiving the hard disk therebetween, each of the fixing members comprising a limiting portion that comprises a positioning pin received in the corresponding positioning hole of the sidewall of the hard disk to fix the hard disk and at least one supporting portion that comprises a supporting plate parallel to the chassis to support the hard disk, wherein the limiting portions are resilient so that the positioning pins can be easily inserted into or removed from the corresponding positioning holes of the hard disk, and wherein a distance between the chassis and the positioning pin is greater than that between the surface of the chassis and the supporting plate; wherein the hard disk defines a plurality of recesses in a bottom wall thereof, and the supporting plates each comprise positioning blocks projecting therefrom upwardly capable of inserted into corresponding recesses of the hard disk.

8. The electronic device as claimed in claim 7, further comprising a plurality of elastic elements respectively located between the limiting portions and the side walls of the hard disk to protect the hard disk from vibration.

9. The electronic device as claimed in claim 7, wherein each supporting portion surrounds each limiting portion with an inverted U-shaped slot defined therebetween to achieve the resilience of the limiting portion to permit the hard disk to be positioned in the hard disk bracket.

10. The electronic device as claimed in claim 7, wherein the limiting portions are separated from the supporting portions.

11. The electronic device as claimed in claim 7, wherein the hard disk bracket is formed using an injection molded process.

* * * * *